(12) United States Patent
Readio et al.

(10) Patent No.: US 7,026,727 B2
(45) Date of Patent: Apr. 11, 2006

(54) POWER SUPPLY WITH MULTIPLE TRANSFORMER CURRENT SHARING

(75) Inventors: Philip O. Readio, Savage, MN (US); Paul G. Schwendinger, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 356 days.

(21) Appl. No.: 10/327,420

(22) Filed: Dec. 20, 2002

(65) Prior Publication Data

US 2004/0120084 A1    Jun. 24, 2004

(51) Int. Cl.
*H02J 1/00* (2006.01)

(52) U.S. Cl. .......................................... 307/83
(58) Field of Classification Search ................ 307/54, 307/70, 83, 87, 127, 138
See application file for complete search history.

(56) References Cited

U.S. PATENT DOCUMENTS

| | | | | |
|---|---|---|---|---|
| 3,745,365 A * | 7/1973 | Spreadbury et al. | ........... | 307/64 |
| 3,996,998 A | 12/1976 | Garst et al. | ..................... | 165/12 |
| 4,150,425 A * | 4/1979 | Frosch et al. | ............ | 363/56.06 |
| 4,232,531 A | 11/1980 | Mangam, Jr. et al. | ........ | 62/171 |
| 4,298,056 A | 11/1981 | Nelson | ........................ | 165/12 |
| 4,445,567 A | 5/1984 | Nelson | ........................ | 165/29 |
| 4,598,764 A | 7/1986 | Beckey | ........................ | 165/29 |
| 4,703,795 A | 11/1987 | Beckey | ........................ | 165/29 |
| 4,860,552 A | 8/1989 | Beckey | ........................ | 62/158 |
| 4,910,966 A | 3/1990 | Levine et al. | .................. | 62/129 |
| 5,309,730 A | 5/1994 | Strand et al. | .............. | 62/228.4 |
| 5,352,930 A | 10/1994 | Ratz | ........................... | 307/43 |
| 5,990,776 A * | 11/1999 | Jitaru | ........................ | 336/200 |
| 6,465,910 B1 * | 10/2002 | Young et al. | ................. | 307/64 |

OTHER PUBLICATIONS

TZ-3 TotalZone® Zone Control Panel, Product Data Sheets, pp. 1-16, Honeywell, Copyright 2001, no month.
TZ-4 TotalZone® Zone Control Panel, Product Data Sheets, pp. 1-20, Honeywell, Copyright 2002, no month.
Installer's Guide Add-On heat Pump Kit, Model TAYPLUS103A, American Standard, Inc., 4 pages, 1996, no month.
Bill Porter, Bill Porter's BPC-1 Dual Fuel™ Control, 2 pages, 1999, no month.

* cited by examiner

*Primary Examiner*—Ronald Leja
(74) *Attorney, Agent, or Firm*—Gregory M. Ansems

(57) ABSTRACT

Devices and methods for using multiple transformers to provide a power supply to a device or system. Included are systems for using multiple transformers and multiple fuses or circuit breakers to provide a power supply. In one embodiment two transformers and two fuses or circuit breakers are used to provide a power supply. Embodiments with greater numbers of fuses and transformers are also disclosed. Also illustrated are methods and devices using thermal circuit breakers to equalize current between multiple transformer sources or to compensate for differences between multiple transformers. Also included are switched schemes for assuring proper phasing of power supply transformers.

37 Claims, 6 Drawing Sheets

POWER SUPPLY WITH MULTIPLE TRANSFORMER CURRENT SHARING

BACKGROUND

The present invention is related to power supplies. More specifically, the present invention is related to power supplies that include multiple transformers.

Modern heating, ventilation and air conditioning (HVAC) systems typically include a thermostat and control electronics. Many systems are single zone systems that require only a single power supply to power the thermostat and/or control panel. The power requirements for such systems can often be satisfied with a single transformer, such as a 24 volt AC, 40 volt-amp (VA) transformer.

Other HVAC systems are multiple zone systems. Multiple zone systems typically define multiple heating and/or cooling zones within a house or other structure. In order to function as a zoned HVAC system, dampers are often provided in the ductwork to control the air flow to the various zones. In many cases, the dampers are powered by a transformer that is separate from the transformer that provides power to the thermostat and/or control panel. In many cases, the transformer that supplies power to the thermostats and/or control panels has excess power capacity, while the transformer that supplies power to the dampers may operate at or near capacity.

SUMMARY

The present invention provides a power supply that includes multiple transformers and allows for current sharing between the transformers. This may allow the load on the transformers to be more evenly distributed, potentially allowing smaller and less expensive transformers to be used in the system.

In one illustrative embodiment, two or more transformers are connected together in parallel, with the secondary windings providing power to a system or device such as an HVAC system. A resistor, having a positive temperature coefficient, is preferably inserted in-line with each of the transformer. The resistor may be inserted in-line with the primary winding or secondary winding, as desired. If the current load on one of the transformers increases, the in-line resistor will produce a corresponding increase in resistance due to increased thermal heating, which will then reduce the current passing through the transformer. This reduction in current will translate into an increased current load on another transformer. Since each of the transformers preferably includes an in-line resistor, the load on each of the transformers may tend to balanced or substantially balanced out. In some embodiments, the in-line resistor may be a thermal fuse, and more preferably, a resettable or self-resetting thermal fuse.

In some embodiments, one or more switches are provided for determining or correcting transformer polarity errors caused by improper transformer installation. The one or more switches may be manually switched, or electronically switched, as desired. When electronically switched, a phase sensor and/or switch control element may be provided for sensing the relative phase of the two or more transformers connected to the system. The switch control may automatically set the one or more switches such that the polarity of the two or more transformers are connected in phase. Another embodiment may include indicator lights to indicate polarity connections.

DETAILED DESCRIPTION

The following detailed description should be read with reference to the drawings. The drawings, which are not necessarily to scale, depict illustrative embodiments and are not intended to limit the scope of the invention.

Figure 1:
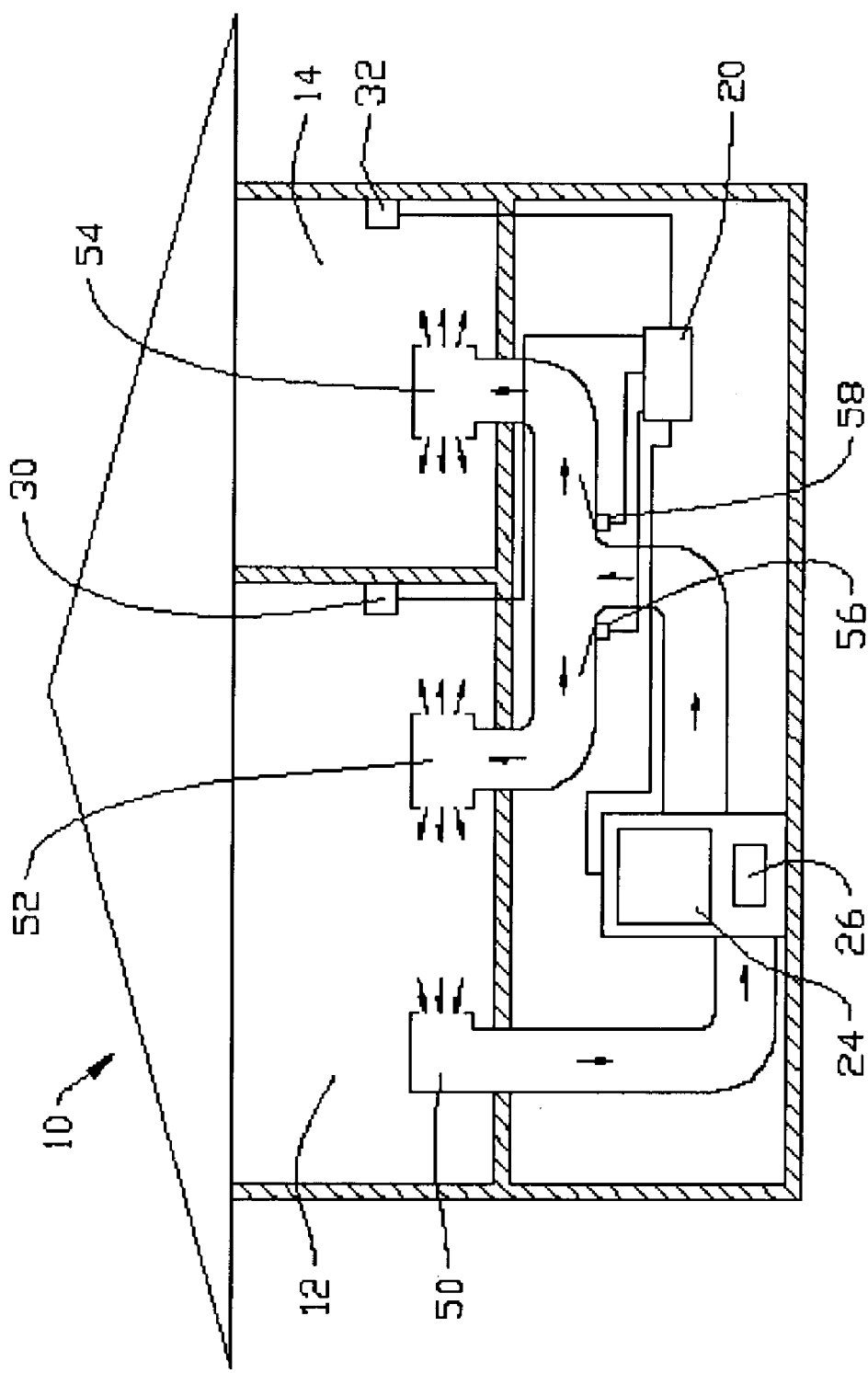
FIG. 1 shows a highly diagrammatic schematic view of a multi-zone HVAC system.

FIG. 1 shows a highly diagrammatic schematic view of a multi-zone HVAC system. The multi-zoned HVAC system is used to control the temperature and/or other environmental parameters in an enclosure 10, in which a first zone 12 and a second zone 14 have been defined. The illustrative HVAC system includes a controller 20 which controls a furnace 24 and a blower 26. The controller 20 gathers information about temperatures in the enclosure 10 from a first thermostat 30 in a first zone 12 and a second thermostat 32 in a second zone 14.

An air intake 50 is shown in the first zone 12, and another air intake (not shown) may be included in the second zone 14, if desired. A first vent 52 feeds air into the first zone 12, and a second vent 54 feeds air into the second zone 14. A first damper 56 controls whether air is forced through the first vent 52 into the first zone 12, and a second damper 58 controls whether air is forced through the second vent 54 into the second zone 14.

In a heating operation, the controller 20 may sense whether either or both of thermostats 30 and 32 indicates a call for heat. If there is a call for heat, the controller 20 activates the blower 26. The controller 20 also may control the position of damper 56 or damper 58. For example, if thermostat 30 indicates a call for heat and thermostat 32 does not, controller 20 may close damper 58 to prevent heated air from being supplied to the second zone 14, and open damper 56 to allow heated air to be supplied to the first zone 12. The controller 20 may then activate the furnace 24. Once both thermostats 30 and 32 indicate that the temperature in each respective zone 12 and 14 is at or above a predetermined set-point temperature, the controller 20 may turn off the furnace 24, and eventually the blower 26. Some systems also include an air conditioner and air conditioner coil, while others may only include an air conditioner and air conditioner coil. In either case, cooling operations may be performed in a manner similar to that described above.

Because dampers 56 and 58 require mechanical movement to selectively block and/or open the various duct paths, significant current drawn can result at least relative to the current draw of the controller 20 and/or thermostats 30 and 32. Therefore, as multi-zone systems have come into use, there has been a need to provide additional current sources beyond those which were needed in earlier, non-zoned systems. Thus, in many multi-zone systems, a first transformer is used to supply power to the control panel 20 and thermostats 30 and 32, and a second transformer is used to supply power to one or more of the dampers 56 and 58.

Figure 2:
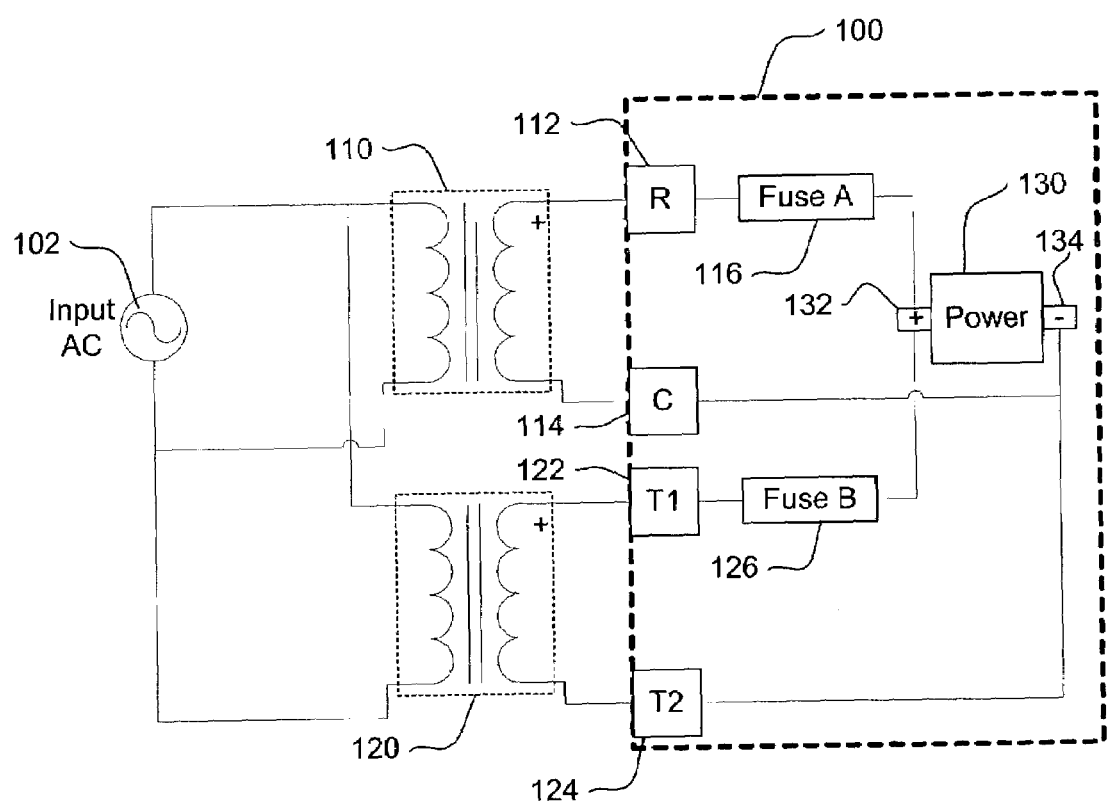
FIG. 2 is a schematic diagram of a multi-transformer power supply in accordance with an illustrative embodiment of the present invention.

FIG. 2 is a schematic diagram of a multi-transformer power supply in accordance with one illustrative embodiment of the present invention. In the illustrative embodiment, a unit 100 is powered by an input AC supply 102. The unit 100 may be any suitable electronic device, including but not limited to, an HVAC system. As shown, the input AC supply 102 is coupled to the primary winding of a first transformer 110 and the primary winding of a second transformer 120. The first transformer 110 may be, for example, a conventional 24 VAC, 40 VA transformer, but other sizes, configurations, and ratings may be used. For example, the first transformer 110 may be a center tapped transformer, though such is not shown in FIG. 2.

The secondary winding of the first transformer 110 is coupled to a first port R 112 and a second port C 114 of unit 100. In the illustrative embodiment, a resistance having a positive temperature coefficient, such as a thermal fuse A 116, is coupled to port R 112. The thermal fuse A 116 may be, for example, a 2.5 ampere thermal circuit breaker. It is contemplated, however, that other sizes or types of circuit breakers may be used including, for example, replaceable, resettable, and/or self-resetting fuses or circuit breakers having a variety of ratings and/or sizes. In the illustrative embodiment, Fuse A 116 is also coupled to a "+" node 132 of a power block 130, and port C 114 of unit 100 is coupled to a "−" node 134 of the power block 130. The +/− symbols are merely illustrative of different polarities, and because of the AC nature of the power supply, may be used to indicate phasing to help ensure proper phasing of devices powered by the power block 130. The power block 130 may supply power to, for example, controllers, thermostats and/or dampers of an HVAC system, if desired. It is contemplated, however, that the power block 130 may supply power to virtually any electronic device, as desired.

For some devices, the first transformer 110 may be unable to provide adequate volt-amp capacity. For example, a zoned HVAC system may include four zones, each zone having three dampers, with each damper drawing a 6 VA load. Such a system would require up to 72 VA of draw for damper control. If the first transformer 110 were a 24 VAC, 40 VA transformer, this power draw would exceed the capacity of the first transformer. This power draw, assuming Fuse A 116 is a 2.5 amp thermal circuit breaker, may also exceed the capacity of the Fuse A 116.

To help ensure adequate power for such a system, a second transformer 120 may be provided. In some embodiments, the second transformer 120 may be the same as the first transformer 110. The secondary winding of the second transformer 120 is coupled to ports T1 122 and T2 124 of unit 100. Port T1 122 is coupled to a Fuse B 126, which is in turn coupled to the "+" node 132 of the power block 130. Port T2 124 is coupled to the "−" node 134 of power block 130.

In other illustrative embodiments, the location of Fuse A 116 and Fuse B 126 may be changed without deviating from the spirit and scope of the present invention. For example, Fuse A 116 may be moved to be in-line with Port C of unit 100. In addition, or alternatively, Fuse B 126 may be moved to be in-line with Port T2 of Unit 100. In yet another embodiment, Fuse A 116 may be moved to be in-line with the primary winding of the first transformer 110, and/or Fuse B 116 may be moved to be in-line with the primary winding of the second transformer 120, if desired. In yet another embodiment, one of the two outputs of the secondary windings of each transformer may be tied together. In such an embodiment, instead of providing separate ports C 114 and T2 124, a single port may be provided.

Although the first transformer 110 and second transformer 120 may be of the same type, or even ostensibly matched transformers, this is not required in all embodiments. For example, in one embodiment, the second transformer 120 may have a higher capacity than the first transformer 110. In this case, the in-line resistance (e.g. Fuse A 116 and/or Fuse B 126) may be adjusted to accommodate the increased current from the second transformer 120, resulting in a desired ratio of currents provided by the first transformer 110 and the second transformer 120, with the temperature coefficients of the in-line resistance helping to maintain the desired ratio of currents.

In some embodiments, the second transformer 120 may be used as a primary power supply, with the first transformer 110 reserved as an emergency power supply if the second transformer 120 were to fail. In such an example, the unit may contain a sensor or the like to detect when the second transformer 120 fails (e.g. if the second transformer 120 fails open or Fuse B 126 blows), and in some cases, causes a device powered by unit 100 to go to a lower-power mode. For example, a multi-zone HVAC system may decouple power to one or more of the dampers (which are often designed to spring open when not powered) when or if the second transformer 120 fails, while the first transformer 110 could continue to power the control panel and/or thermostats to provide emergency, un-zoned power.

As noted above, Fuse A 116 and Fuse B 126 may be thermal circuit breakers. Such thermal circuit breakers may include the property that the resistance of the circuit breaker varies in relation to the temperature of the circuit breaker. Due to thermal heating or the like, the temperature may depend on the current passing through the circuit breaker. These effects are further illustrated in FIGS. 3A–3B.

Figure 3A:
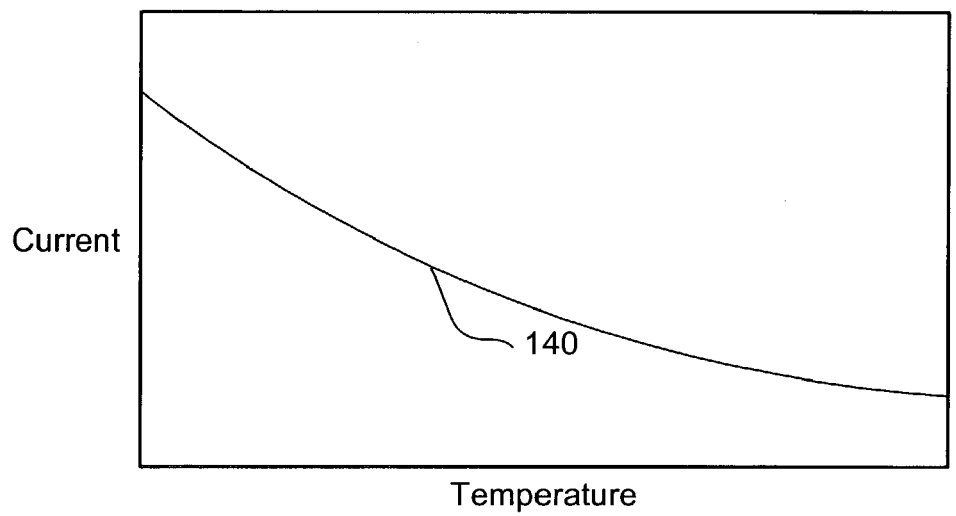
FIGS. 3A–3B illustrate current-balancing between the multi-transformer power supply of FIG. 2.
Figure 3B:
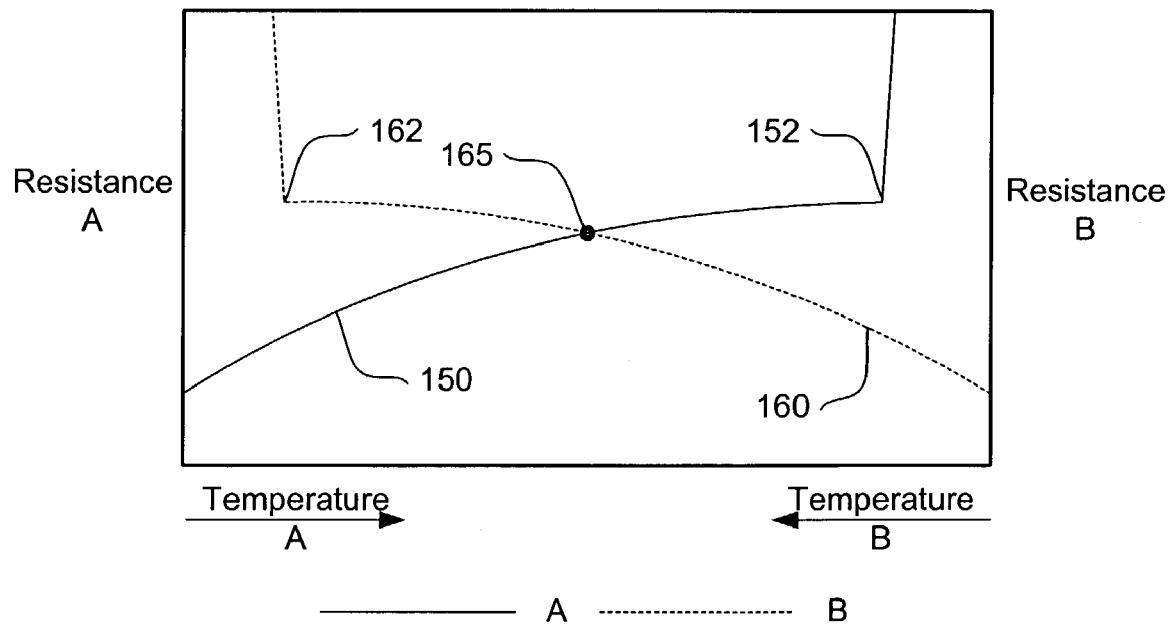

FIGS. 3A–3B illustrate current-equalization of a multi-transformer power supply in accordance with the present invention. In FIG. 3A, line 140 illustrates a typical curve for current versus temperature for a thermal fuse that could be used as Fuse A 116 and/or Fuse B 126 (see FIG. 2). In particular, the curve shows that the current decreases as the operating temperature increases across a certain range of currents, which corresponds to a positive temperature coefficient for the resistance of the thermal fuse. FIG. 3B shows the increase in resistance of a thermal circuit breaker or fuse as temperature increases. In FIG. 3B, solid line A 150 represents a first thermal fuse, while dashed line B 160 represents a second thermal fuse, with the temperature scale reversed for the second thermal fuse and solid line B 160. In the illustrative embodiment, the resistance changes relatively slowly until the breakpoints 152, 162 are reached, at which point the resistance goes up extremely quickly as the circuit breaker opens.

Referring back to FIG. 2, the various elements and components of the system, including leads, lines, and transformers of the system, can vary in impedance due to variations in materials and manufacturing. The thermal circuit breaker graphs shown in FIGS. 3A–3B illustrate that Fuse A 116 and Fuse B 126 can help compensate for such variations in impedance. For example, the transformers 110 and 120 of FIG. 2 may be the "same" transformer, but may not be well matched. A difference in the output impedance of one from that of the other may cause differences between the current levels provided by each transformer. When Fuse A 116 and Fuse B 126 have characteristics as shown in FIGS. 3A and 3B, these transformer differences can be compensated. For example, if the first transformer 110 has a lower impedance than the second transformer 120, then initially the first transformer 110 will provide more current than the second transformer 120. However, with the increased current flow from the first transformer 110, Fuse A 116 may be heated relative to Fuse B 126 and the resistance will increase. As Fuse A 116 increases in resistance, the impedance looking into Fuse A 116 also increases until the impedance is equal to that seen looking through Fuse B 126.

At this point in operation, a settling point or state is reached. Such a state is represented in FIG. 3B by operating point 165. Because the coordinates on the axes are not the same, the actual values of the temperature and resistance of each fuse may not be exactly equal. However, the impedance seen through the fuses and transformers, back to the input AC 102, should be substantially equalized. Hence the overall impedance equalizes and the current flow through each transformer is equalized or substantially equalized. In some embodiments, the current flow is not necessarily equal once the circuit stabilizes, but differences between elements are compensated to some extent and operation may be improved.

Although it is noted above that the first transformer 110 and second transformer 120 may be of the same type, or even ostensibly matched transformers, this is not required. For example, in one embodiment, one of the transformers may have a higher capacity than another one of the transformers. In this case, the resistance provided by Fuse A 116 and/or Fuse B may be set to accommodate the increased current from the transformer with a higher capacity to provide a desired ratio of currents between the transformers, with the temperature coefficients helping to maintain the desired ratio of currents. In this embodiment, and with reference to FIG. 3B, the resistance curve for one of the transformers may be shifted upward or downward relative to what is shown with a corresponding change in operating point 165.

Figure 4:
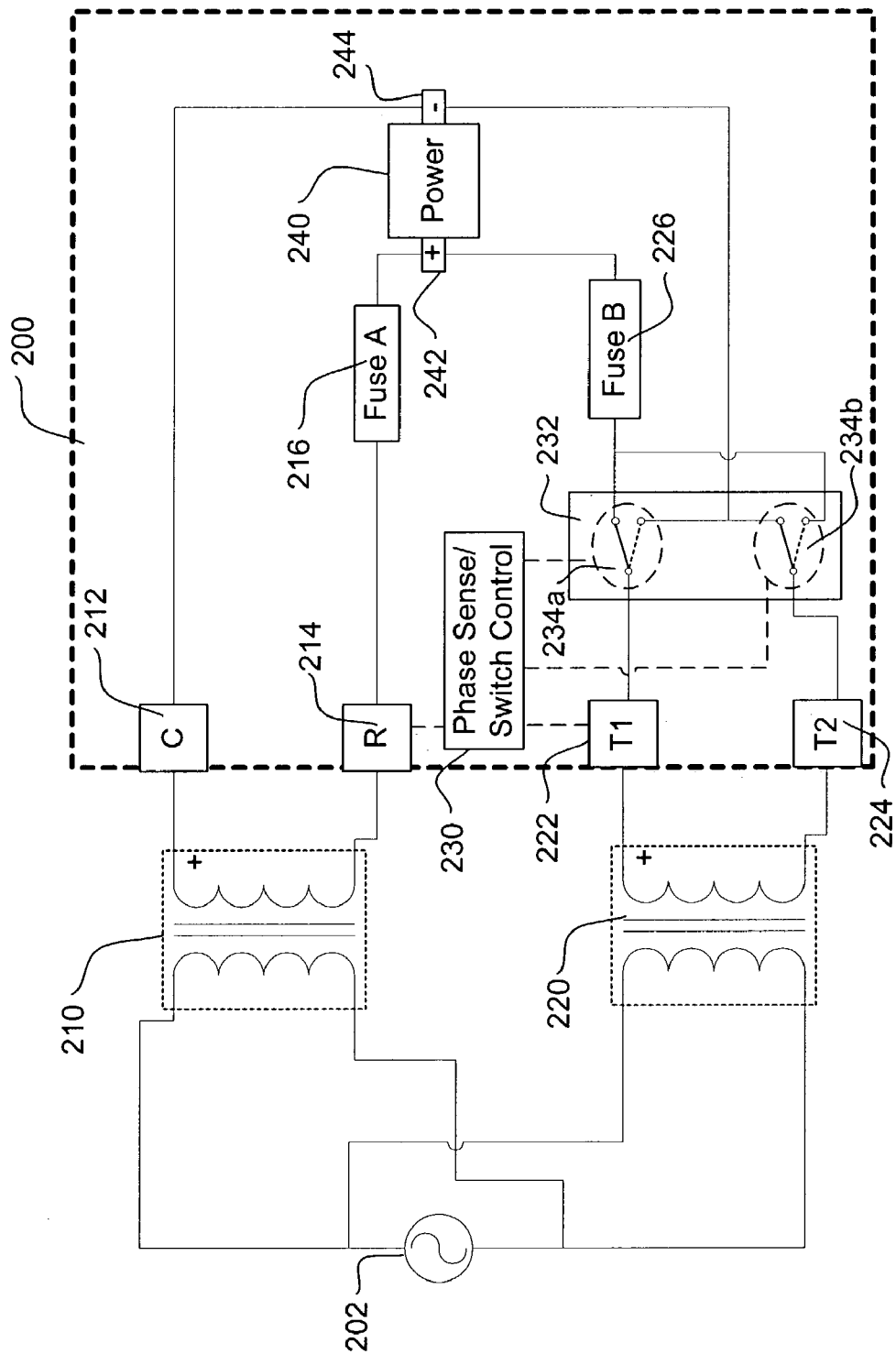
FIG. 4 is a schematic diagram of another illustrative multi-transformer power supply that includes a phase sensor and switch control to provide correct phasing of the transformers.

FIG. 4 schematically illustrates another illustrative embodiment of a multi-transformer power supply in accordance with the present invention. In this illustrative embodiment, a unit 200 is powered by an AC supply 202, which may be an ordinary wall outlet power supply, for example. A first transformer 210 is connected on a primary side to the AC supply 202, and on the secondary side to a port C 212 and a port R 214. The port C 212 is in turn connected to a "−" port 244 of a power block 240, while port R 214 is connected to a first side of a Fuse A 216, which is in turn connected to a "+" port 242 of the power block 240. Also shown is a second transformer 220, which is connected on a primary side to the AC supply 202. The secondary side of the second transformer 220 is connected to a port T1 222 and a port T2 224.

FIG. 4 also schematically illustrates phase sense and switch control 230, which may control, for example, a double-pole double-throw switch shown generally at 232. In some embodiments, the double-pole double-throw switch may include a first switch 234*a* and a second switch 234*b* as shown. The purpose of switch control 230 and switch 232 is to provide proper phasing between the first transformer 210 and the second transformer 220. In the embodiment shown, the switch 232 may be in an intermediate open position unless a voltage is supplied by switch control 230 to close the switch in one direction or the other. In FIG. 4, the switch 232 is shown switched in a first position with solid switch lines and a second position with dashed switch lines. It is contemplated, however, that other types of switches may be used including mechanical and/or electrical switches of any suitable type.

In one embodiment, for example, switch control 230 is adapted to sense the voltage difference between port R 214 and port T1 222. If the voltages on the two ports 214 and 222 are the same, a first phasing state for the two transformers 210 and 220 is indicated with respect to the unit 200. In the first phasing state, port R 214 and port T1 222 both represent the same polarity output of transformers 210 and 220. Therefore, port R 214 and port T1 222 would properly be coupled together without a phasing error. In order to couple port R 214 to port T1 222, switch 232 can be switched to the first state indicated by solid switch lines, so that port T1 is couple to Fuse B 226, which in turn is coupled to the "+" node 242 of the power block 240, which is also coupled to port R 214. Likewise, port T2 224 is coupled to the "−" node 244 of the power block 240. In the illustrative example of FIG. 4, the transformers 210 and 220 have not been connected in the first phasing state, and the voltages at port R 214 and port T1 222 are not in phase.

If the voltages on the two ports 214 and 222 are significantly different or vary widely with time, as would occur if connected as shown in the illustrative embodiment of FIG. 4, then a second phasing state is indicated. In the second phasing state, port R 214 is out of phase with port T1 222, and port C 212 is in phase with port T1 222. If the second phasing state is sensed, switch control 230 may set switch 232 to the second state indicated by dashed switch lines, which couples port T2 to Fuse B 226, which is in turn coupled to the "+" node 242 of the power block 240, which is coupled to Fuse A 216 and port R 214. Likewise, port T1 222 is coupled to the "−" node 244 of the power block 240, completing the coupling of the power circuitry.

The above illustrative embodiments may use a simple phase-sensing mechanism between two ports. Other mechanisms for detecting proper or improper phasing may also be used. For example, a more comprehensive phase sensing scheme may detect voltages at each of the several input ports. A phase sensing scheme using only three input ports may also be used. For example, a three-port illustrative embodiment may include a first port that is coupled to a first output of a first transformer, a second port that is coupled to a first output of a second transformer, and a third port that is coupled to the second outputs from both transformers. When a voltage sensor detects that a voltage differential between the first and second ports exceeds a certain level, improper phasing may be detected.

In some embodiments, switch 232 may be manually controlled so that a technician or the like can easily reverse the phase between the first and second transformers without having to rewire the transformers within the system. To help facilitate identifying a miss-phasing condition, it is contemplated that an indicator may be provided. For example, an LED indicator may light to indicate a first phasing state between the first and second transformers, and may remain off if a second phasing state occurs. A manual switch may then be used to provide proper polarity to the power supply.

In some embodiments, Fuse A 216 and Fuse B 226 may be provided with indicators for indicating whether either or Fuse 216, 226 has blown or is opened. In one such embodiment, a switch may be provided that can switch the polarity of the connection for ports T1 222 and T2 224. Depending on whether Fuse A 216 or Fuse B 226 is opened, the switch may be toggled to change the polarity. For example, when such a system is connected to power from both transformers 210 and 220, an incorrect polarity may cause one of Fuse A 216 or Fuse B 226 to open, such that an indicator light turns on. Then an installer may toggle a switch to change the connection polarity. Once the opened circuit breaker is replaced or reset, either manually or by a thermal, internal or timed reset mechanism or device, the power supply may then function properly with the corrected polarity.

In some embodiments, switch control 230 may be powered by the first transformer 210 which is, in effect, a default transformer for the illustrative embodiment, since the first transformer 210 is always connected unless Fuse A 216 opens. Additional transformers may be connected in a manner similar to that of the second transformer 220, making for an expandable system that can allow the use of several cheap and common transformers in place of larger and/or more expensive models. For example, many transformers which are larger than 24 VAC, 40 VA are required (for example by UL specifications) to contain internal fuses or circuit breakers, adding to bulk and expense.

In additional embodiments, multiple small transformers may be used in place of a larger single transformer so that a degree of redundancy may be provided. For example, in a system having zones and dampers calling for 72 VA of power, a power supply having a default transformer and two additional, switched-in transformers may be used. Assuming each transformer has 40 VA capacity, only two transformers may be needed at any given time. However, if one transformer were to fail open, two would remain available for use. All of the transformers may be coupled in parallel as described above, or one or more transformers may be automatically or manually switched-in to create redundancy.

Further, such a system could be easily expanded. For example, a zoning system could be initially installed on a house, and the homeowners may decide to add additional zones or improvements to the house, creating extra zones and requiring more dampers. A system using one or more switched-in transformers could easily expand to provide added power for the new dampers.

Some embodiments can include a sensor or sensors, or other control mechanisms, for determining when and whether additional transformers should be switched in. For example, in a zoned HVAC system having several dampers, no damper supply current may be needed during certain times (for example during certain low power operating modes when a structure is unoccupied). During such a low power cycle or operation, the current carrying capacity of additional transformers may not be needed. In such a case, if the unit 200 is part of an HVAC system and connected, for example, to a controller such as controller 20 in FIG. 1, the controller 20 may be coupled to the phase sense/switch control box 230 (FIG. 4) and cause switch 232 to go to an intermediate open state, since the power of the second transformer 220 would not be needed. Such a low power mode switching may be useful, for example, to reduce quiescent power consumption in some cases.

Figure 5:
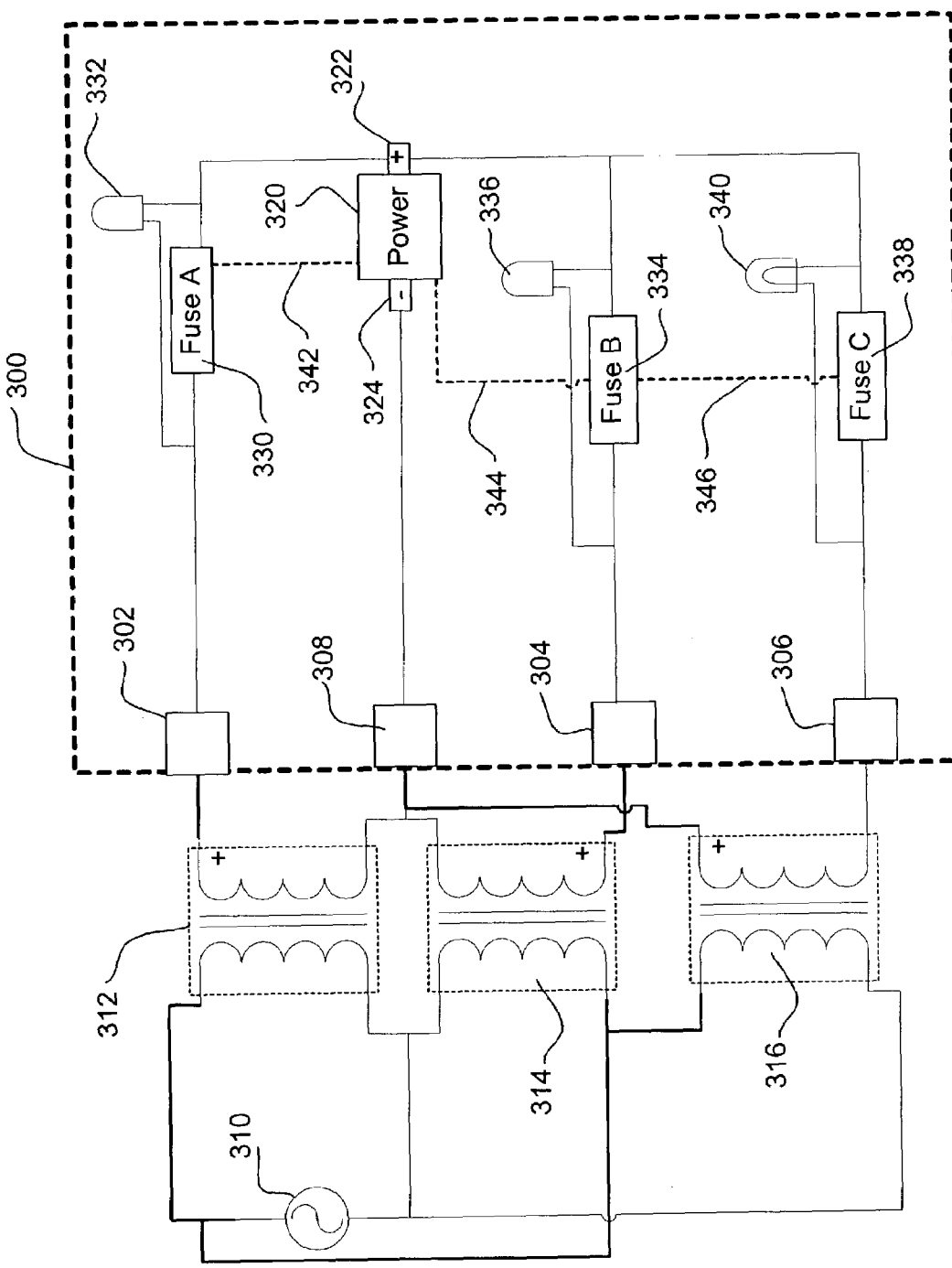
FIG. 5 is a schematic diagram of an illustrative multi-transformer power supply that includes a more compact input port design and further includes fuse-out indicators for determining which of several transformers may be improperly connected out of phase.

FIG. 5 is another schematic diagram of an illustrative multi-transformer power supply including a more compact input port design and including fuse-out indicators for determining which of several transformers may be incorrectly connected. The illustrative embodiment includes a power unit 300 with four ports 302, 304, 306, 308 shown (more or less ports may be included in unit 300 but are not shown). Three ports 302, 304, 306 are configured for connecting to a first output of a transformer, while the fourth port 308 is configured for connecting to the second output of each of several transformers. In the illustrative example, an AC power supply 310 is provided and connected to three transformers 312, 314, 316. The first transformer 312 is connected to a first port 302 and the collective port 308. The second transformer 314 is connected to a second port 304 and also to the collective port 308, while the third transformer is connected to a third port 306 as well as the collective port 308.

In the illustrative example, the collective port 308 is connected to a "−" port of power block 320. In another embodiment, a master fuse (not shown in the illustrative embodiment of FIG. 5) may be provided between collective port 308 and the "−" port 324 of power block 320, with the master fuse adapted to limit overall current running through unit 300. Each of the other input ports 302, 304, 306 is connected to a corresponding fuse 330, 334, 338, respectively. Each fuse 330, 334, 338 has a corresponding indicator light 332, 336, 340. The indicator lights 332, 336, 340 may be adapted to turn on if a corresponding fuse 330, 334, 338 blows or otherwise opens. Also included are several control connections 342, 344, 346 from the power block 320 to the fuses 330, 334, 338. The control connections 342, 344, 346 may be adapted to allow the fuses 330, 334, 338 to be selectively opened during a low power state, if desired.

Several connections to the inputs and outputs of the transformers 312, 314, 316 corresponding to the side with the "+" polarity marker are thickened to show the connection polarities. It can be seen from the "+" polarity marker on each transformer 312, 314, 316 and the thickened connection lines that the transformers 312, 314, 316 have been supplied from the AC power supply 310 with the same phasing. However, it can be seen that, while two transformers 312 and 314 are connected with the same polarity (thin lines not corresponding to the "+" marker) to the collective port 308, the third transformer 316 has been connected with opposite polarity. This represents a phasing mismatch in the connection of the transformers 312, 314, 316.

However, in the illustrative embodiment, indicator lights 332, 336, 340 can enable a technician to easily determine by visual inspection which transformer 312, 314, 316 is incorrectly connected. As connected, Fuse C 338 would blow, as indicated by indicator light 340, which is shown "on" by the additional line inside the indicator light 340 symbol, as opposed to the "off" indicator lights 332 and 336. The reason Fuse C 338 would blow is that, because of the improper connections, the connections through the fuses to the +input 322 of the power block 320 would be a short circuit. However, both Fuse A 330 and Fuse B 334 each share current because they are parallel to one another in the short circuited device, while Fuse C 338 must carry about twice the current of the other fuses 330 and 334. Therefore, Fuse C 338 is likely to blow open first, ending the short circuit by breaking the incorrectly connected third transformer 316 out of the circuit. Note that, alternatively, if Fuse C 338 for some reason fails to blow open first, both Fuse A 330 and Fuse B 334 should fail, since each fuse 330 and 334 would have to carry a larger current as well.

In the illustrative embodiment, a technician may connect the transformers 312, 314, 316 to the AC power 310 and the unit 300. The technician may then observe the indicator lights 332, 336, and 340 to determine whether any of the fuses 330, 334, 338 have blown. The technician may then switch the polarity of each transformer 312, 314 or 316 for which a fuse 330, 334, or 338 opens. In the illustrative example shown in FIG. 5, the technician would likely reverse the connections either to or from the third transformer 316 which has incorrect polarity. Note that changing the connections on either one of the windings of the third transformer 316 would be sufficient to correct the phasing mismatch.

Figure 6:
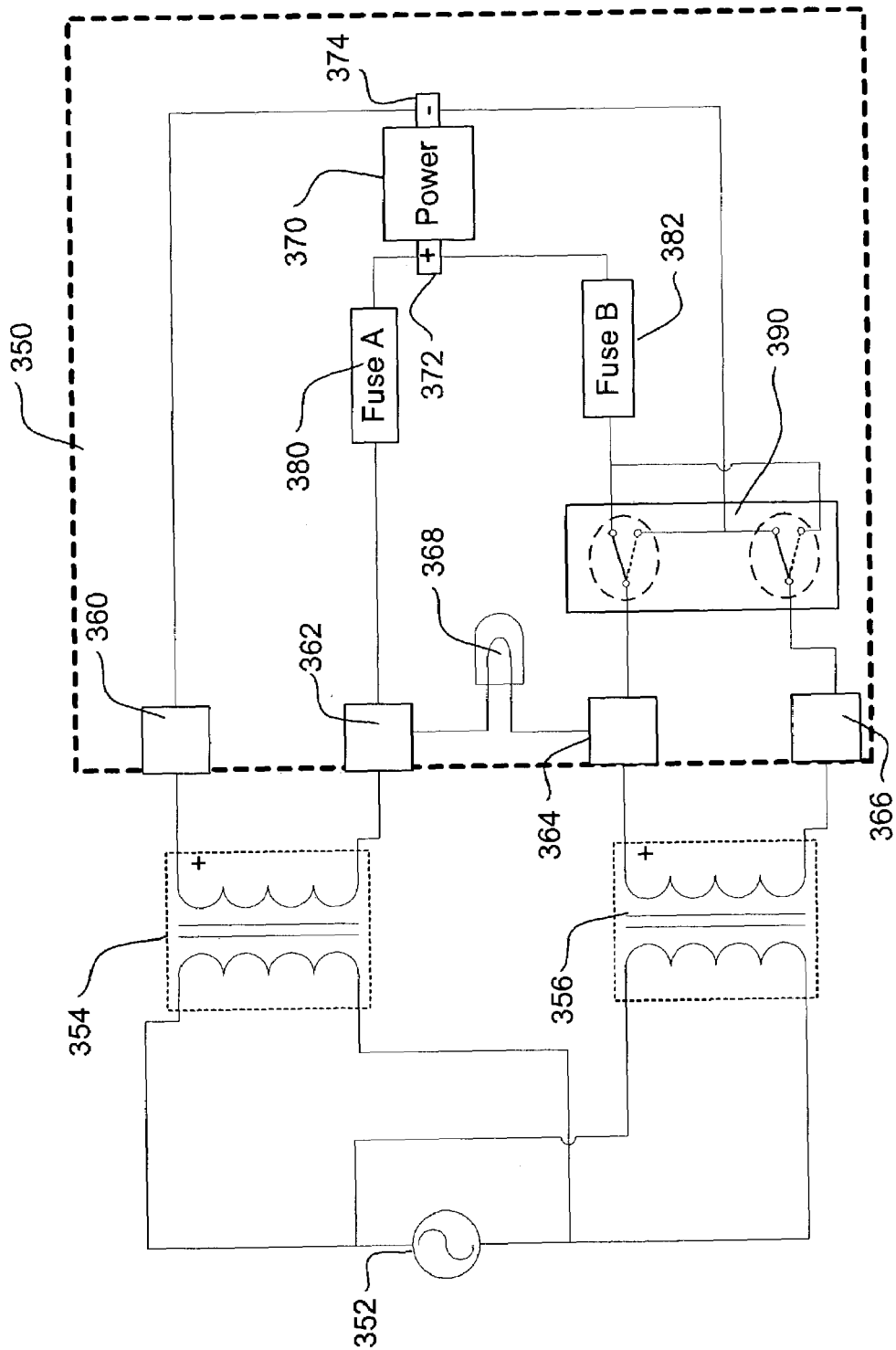
FIG. 6 is a schematic diagram of an illustrative embodiment using a manual switch and indicator lights for selecting correct polarity.

FIG. 6 is a schematic diagram for an illustrative embodiment for a multi-transformer power supply using a manual switch and indicator lights for selecting correct polarity. A power unit 350 is supplied with power from an AC power supply 352, which is coupled into the power unit 350 via a first transformer 354 and a second transformer 356. The first transformer 354 is coupled to a first port 360 and a second port 362. The second transformer 356 is coupled to a third port 364 and a fourth port 366. An indicator light 368 is provided for indicating whether the second port 362 and the third port 364 are connected in phase or out of phase. Note that, as shown in FIG. 6, the second port 362 and the third port 364 are connected out of phase, which is why the symbol for the indicator light 368 includes a line to indicate it is "on".

Power unit 350 includes power block 370 having a "+" input 372 and a "−" input 374. First port 360 is coupled to the "−" input 374. Second port 362 is connected to the "+" input 372 via Fuse A 380. Third port 364 and fourth port 366 are coupled to double-pole double-throw switch 390.

The illustrative embodiment of FIG. 6 may be used as follows. A technician may connect the first transformer 354 and second transformer 356 to the AC power 352 and the ports 360, 362, 364, 366 on the unit 350. Next, the technician may observe indicator light 368 to determine whether the second port 362 and third port 364 are in phase or out of phase. Then the technician may set or reset the switch 390 to corresponding to correct phasing. Note that, for this embodiment, one of the fuses 380, 382 may initially blow open when connected if the switch 390 is in the wrong position for the connection phasing. In some embodiments, the fuses 380, 382 may be self-resetting or easily resettable in order to allow for such an initial phasing mistake without creating excessive expense or difficulty.

In some embodiments, the units having a number of ports may be configured or marked with diagrams or other indications that a technician may use to determine which pairs or groups of ports are to be used in what ways. For example, referring to FIG. 6, the first port 360 and the second port 362 may be provided relatively close together, or with a marking such as "FIRST TRANSFORMER" or other designation to indicate the ports 360, 362 are to be coupled to the same transformer. The third port 364 and fourth port 366 may also be relatively close together or have a similar marking, while the pairings of ports may be placed at a relative distance from one another. For example, in an illustrative embodiment, the first port 360 and second port 362 may be placed side-by-side in a first row, and third port 364 and fourth port 366 may be placed side-by-side in a second row.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A power supply comprising:
 a first transformer having a first winding and a second winding;
 a second transformer having a first winding and a second winding;
 the second winding of the first transformer is connected in parallel with the second winding of the second transformer;
 a first resistive element having a temperature coefficient, the first resistive element is provided in line with the first transformer; and
 a second resistive element having a temperature coefficient, the second resistive element is provided in line wit the second transformer.

2. A power supply according to claim 1 wherein the first winding of the first transformer is a primary winding and the second winding of the first transformer is a secondary winding.

3. A power supply according to claim 2 wherein the first winding of the second transformer is a primary winding and the second winding of the second transformer is a secondary winding.

4. A power supply according to claim 2 wherein the first resistive clement is provided in-line with the primary winding of the first transformer.

5. A power supply according to claim 2 wherein the first resistive element is provided in-line with the secondary winding of the first transformer.

6. A power supply according to claim 3 wherein the second resistive element is provided in-line with the primary winding of the second transformer.

7. A power supply according to claim 3 wherein the second resistive element is provided in-line with the secondary winding of the second transformer.

8. The device of claim 1 wherein:
 the first resistive element is a first fusing device and the second resistive element is a second fusing device;
 the first fusing device and the second fusing device are adapted to substantially equalize the current passing through the first transformer and the second transformer.

9. The device of claim 1 wherein:
 the first resistive element is a first fusing device and the second resistive element is a second fusing device;
 the first fusing device and the second fusing device are adapted to provide a desired ratio of current passing through the first transformer and the second transformer.

10. The device of claim 1 wherein the first resistive element and the second resistive element are adapted to compensate for impedance differences between the first transformer and the second transformer.

11. A device for providing a power supply, the device comprising:
 a first output node and a second output node both adapted to enable a power supply voltage to be taken between the first output node and the second output node;
 first fusing means;
 second fusing means; and
 wherein, when the device is connected to a first transformer and a second transformer in a predetermined configuration, a first current path from the first output node to the second output node includes the first fusing means and a winding of the first transformer, and a second current path from the first output node to the second output node includes the second fusing means and a winding of the second transformer; and
 the first fusing means and the second fusing means are adapted to compensate for impedance differences between the first transformer and the second transformer.

12. The device of claim 11 wherein the first fusing means and the second fusing means are adapted to substantially equalize the current passing through the winding of the first transformer and the current passing through the winding of the second transformer.

13. The device of claim 11 wherein the first fusing means and the second fusing means are both self-resetting thermal fuses.

14. The device of claim 11 wherein the first fusing means is sized and configured to prevent damage to the first transformer.

15. A device for providing a power supply comprising:
a first power node;
a second power node;
a plurality of input ports;
a first fuse element having an input and an output; and
a second fuse element having an input and an output;
wherein:
the input ports are adapted to be connected to outputs of a first transformer and a second transformer; and
the inputs of the first fuse element and the second fuse element are configured such that, if the input ports are connected to the first transformer and the second transformer, a first current path exists from the first power node to the second power node through the first fuse element and a winding of the first transformer, and a second current pat exists from the first power node to the second power node through the second fuse element and a winding of the second transformer.

16. The device of claim 15 wherein the first and second fuse elements are thermal fuses.

17. The device of claim 16 wherein the thermal fuses are self-resetting fuses.

18. The device of claim 16 wherein each thermal fuse has an impedance that depends on the amount of current passed by the fuse.

19. The device of claim 16 wherein the impedance of each fuse increases with increasing current.

20. The device of claim 15 wherein the first and second fuse elements are circuit breakers.

21. The device of claim 15 wherein the first and second fuse elements are resettable fuses.

22. The device of claim 15 wherein the first and second fuse elements include indicators for indicating whether the fuse element has opened or remains closed.

23. The device of claim 15 further including a first indicator and a second indicator, the first indicator being coupled to the first fuse element and adapted to indicate whether the first fuse element has opened or remains closed, the second indicator being coupled to the second fuse element and adapted to indicate whether the second fuse element has opened or remains closed.

24. A device for receiving current from a first transformer and a second transformer, the device comprising:
a plurality of input ports that are adapted to be couple to outputs of a first transformer and a second transformer;
a first switch for selectively coupling a first input port to a node;
a second switch for selectively coupling a second input port to the node; and
control means for controlling the first switch and the second switch, the control means configured such that the control means causes the first switch to couple the first input port to the node if the first input port is in phase with a third input port and the second switch to couple the second input port to the node if the first input port is not in phase with the third input port.

25. The device of claim 24 wherein the first and second switches are adapted to remain in an intermediate open position unless closed.

26. The device of claim 24 wherein the first port and the second port are configured to be coupled to the first transformer, and the third port and a fourth port are configured to be coupled to the second transformer.

27. A device for receiving current from a first transformer and a second transformer, the device comprising:
a plurality of input ports that are adapted to be couple to outputs of the first transformer and the second transformer;
switching means for selectively coupling either a first input port or a second input port to a node; and
sensing means for sensing whether the first input port or the second input port is in phase with a third input port.

28. The device of claim 27 further comprising indicator means for indicating whether the first input port is in phase with the third input port and whether the second input port is in phase with the third input port, wherein the switching means is adapted to be manually switched if either the first port or the second port is in phase with the third port.

29. The device of claim 27 further comprising control means coupled to the sensing means and the switching means, wherein:
the sensing means is adapted to provide an output signal; and
the control means is adapted to cause the switching means to couple the outputs of the first transformer to the outputs of the second transformer with proper phasing in response to the output signal of the sensing means.

30. A method of providing electric power comprising:
accepting an input current from a first transformer;
accepting an input current from a second transformer;
causing the input current from the first transformer and the input current from the second transformer to be at or near a desired ratio; and
providing the input current from the first transformer and the input current from the second transformer to power a device.

31. The method of claim 30 wherein the step of causing the input current from the first transformer and the input current from the second transformer to be at or near a desired ratio includes the step of at least substantially equalizing the input current from the first transformer and the input current from the second transformer.

32. The method of claim 30 wherein the step of causing the input current from the first transformer and the input current from the second transformer to be at or near a desired ratio is performed by providing first and second resistive elements in series with respective windings of the first and second transformers, the first and second resistive elements having thermal coefficients, wherein the first and second resistive elements are selected to cause the input current from the first transformer and the input current of the second transformer to be at or near the desired ratio.

33. A method of coupling transformers together to simultaneously provide electric current from each transformer, the method comprising:
providing a panel including a plurality of ports adapted to receive outputs from secondary windings of a number of transformers;
providing a first fusing device and a second fusing device, each fusing device having an input and an output;
coupling a first transformer to the panel such that the first fusing device is in series with the first transformer; and coupling a second transformer to the panel such that the second fusing device is in series with the second transformer.

34. The method of claim 33 wherein the first and second fusing devices include indicators for indicating whether the respective fusing device has opened, the method further including the steps of:
   determining if either indicator indicates that a fusing device has opened; and
   reversing the polarity of one of the transformers if either indicator indicates that a fusing device has opened.

35. The method of claim 34 wherein the step of reversing the polarity of one of the transformers is performed without disconnecting either transformer from the panel.

36. The method of claim 33 further comprising the steps of:
   providing a first output node and a second output node; and
   coupling the fusing devices such that a first current path from the first output node includes a winding of the first transformer and the first fusing device and a second current path from the first output node to the second output node includes a winding of the second transformer and the second fusing device.

37. A method of providing electrical power to a system comprising:
   determining whether a first port and a second port are in phase, the first port being coupled to a first transformer and the second port being coupled to a second transformer, the first transformer having first and second windings and the second transformer having first and second windings, the first port being coupled to the second winding of the first transformer and the second port being coupled to the second winding of the second transformer, the first windings of the first and second transformers receiving current from a common power source;
   electrically coupling the first port to the second port if the first port and the second port are in phase; and
   electrically isolating the first port from the second port if the first port and the second port are out of phase.

* * * * *